United States Patent [19]

Seizert et al.

[11] Patent Number: 5,102,172
[45] Date of Patent: Apr. 7, 1992

[54] FUEL SENDER LOCKING RING

[75] Inventors: Robert D. Seizert, Brooklyn; James R. Osborne, Pontiac, both of Mich.

[73] Assignee: Solvay Automotive, Inc., Houston, Tex.

[21] Appl. No.: 668,144

[22] Filed: Mar. 11, 1991

Related U.S. Application Data

[62] Division of Ser. No. 419,486, Oct. 10, 1989, Pat. No. 4,998,639.

[51] Int. Cl.5 .............................................. B65D 41/06
[52] U.S. Cl. .................................. 292/256.6; 220/298
[58] Field of Search .................. 200/85 F, 203, 297, 200/298, 300, 302, 304, DIG. 35; 292/356.6, 256–263, 300, 304

[56] References Cited

U.S. PATENT DOCUMENTS

| | | | |
|---|---|---|---|
| 1,833,694 | 11/1931 | Stant | 292/DIG. 32 |
| 1,846,677 | 2/1932 | Edwards | 220/85 F |
| 1,866,126 | 7/1932 | Payson et al. | 220/300 X |
| 1,882,097 | 10/1932 | Stant | 220/DIG. 32 |
| 1,989,297 | 1/1935 | Stant | 220/DIG. 32 |
| 2,680,477 | 6/1954 | Schira, Jr. | 220/297 X |
| 3,076,577 | 2/1963 | Craig | 220/297 |
| 4,081,102 | 3/1978 | Sakai | 220/203 |
| 4,333,580 | 6/1982 | Sweigart, Jr. | 220/297 |
| 4,482,075 | 11/1984 | Stotz et al. | 220/DIG. 35 |
| 4,497,419 | 2/1985 | Reitzel | 220/302 |
| 4,501,376 | 2/1985 | Bushby | 220/298 |
| 4,762,244 | 8/1988 | Ziegler | 220/85 F |

FOREIGN PATENT DOCUMENTS

| | | | |
|---|---|---|---|
| 2734217 | 8/1979 | Fed. Rep. of Germany | 220/298 |
| 135108 | 11/1979 | Fed. Rep. of Germany | 220/298 |
| 135109 | 11/1979 | Fed. Rep. of Germany | 220/298 |
| WO91/05713 | 5/1991 | World Int. Prop. O. | |

Primary Examiner—Richard E. Moore
Attorney, Agent, or Firm—Willian Brinks Olds Hofer Gilson & Lione

[57] ABSTRACT

A locking member for use in a fuel tank assembly of the type having a pressurizable tank with an aperture and having a plurality of retaining lugs transversely extending along the periphery of the tank aperture. A fuel sender assembly having a first portion disposed within the aperture and a second portion having a plate-like shoulder in mating contact with an external tank surface. A seal element is disposed between the tank and the fuel sender assembly in an annular groove provided in the external tank surface intermediate the aperture and the retaining lugs. The locking member comprising a locking ring having an aperture through which a portion of the fuel sender assembly extends, the locking ring having a generally planar lower surface in mating contact with an upper surface of the plate-like shoulder of the fuel sender assembly and having a plurality of lug supports corresponding to the plurality of retaining lugs. The lug supports having locking nubs for lockingly engaging the retaining lugs and a flange section surrounding the retaining lugs for inhibiting permanent deformation thereof due to greater fluid pressure within the tank.

7 Claims, 4 Drawing Sheets

FUEL SENDER LOCKING RING

This is a division of our co-pending U.S. patent application Ser. No. 07/419,486 filed on Oct. 10, 1989, now U.S. Pat. No. 4,998,639, issued Mar. 12, 1991.

BACKGROUND AND SUMMARY OF THE INVENTION

The present invention relates to automotive fuel delivery systems and, in particular, to an improved locking ring for locking a fuel sender assembly to a fuel tank.

Conventional automotive fuel sending systems typically include a locking ring for securely mounting and sealing a fuel sender assembly to a fuel tank. Commonly, the locking ring is provided with lug supports along its outer peripheral edge which lockingly engage retaining lugs extending from the fuel tank for sealing the fuel sender assembly therebetween. Such systems are designed to permit a predetermined amount of fuel leakage and venting of fumes immediately upon impact to relieve any excessive pressure build-up within the fuel tank. However, it is critical that the fluid-tight seal between the fuel sender assembly and the fuel tank be maintained following venting of a pressure build-up to prevent excessive fuel and vapor leakage. In particular, a primary reason for premature release of fuel and fumes upon vehicular impact is the failure of the locking ring to withstand the increased tank pressure. The increased tank pressure acting on the fuel sender assembly and locking ring can cause permanent deformation of the retaining lugs. Structural deformation of the retaining lugs results in degradation of the seal between the fuel sender assembly and the fuel tank. Furthermore, with the advent of stricter vehicle safety standards, conventional fuel delivery systems are inadequate to meet minimum crashworthiness requirements.

It is therefore an object of the present invention to provide a relatively simple and inexpensive design for an improved locking ring for use in automotive fuel delivery systems. The improved locking ring can withstand substantially greater fuel tank pressures following vehicular impact so as to inhibit premature leakage of fuel and vapors. The improved locking ring inhibits permanent deformation of the fuel tank retaining lugs to maintain the fuel sender assembly in sealed relationship with the fuel tank.

Other advantages and features will become apparent from the following specification taken in connection with the accompanying drawings.

DETAILED DESCRIPTION OF THE PREFERRED EMBODIMENTS

Figure 1:
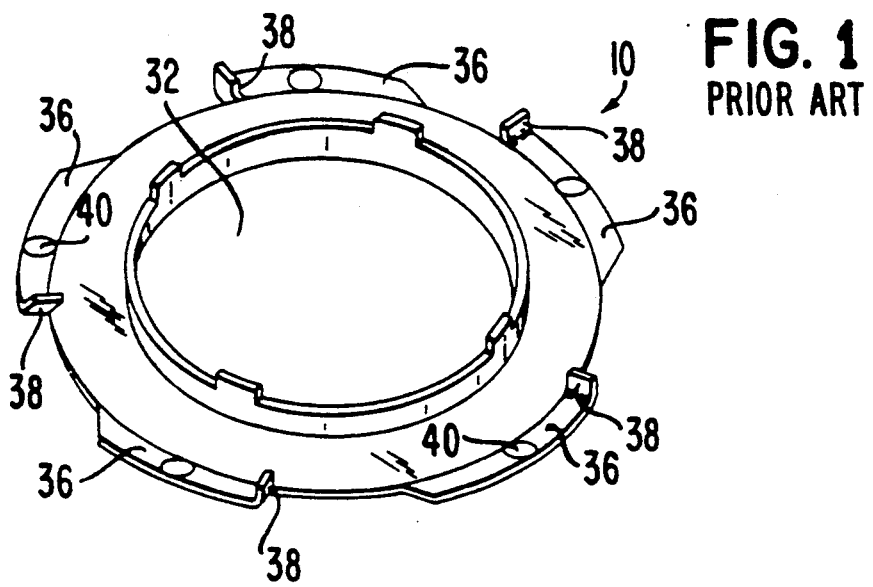
FIG. 1 is a perspective view of a conventional fuel sender locking ring.
Figure 2:
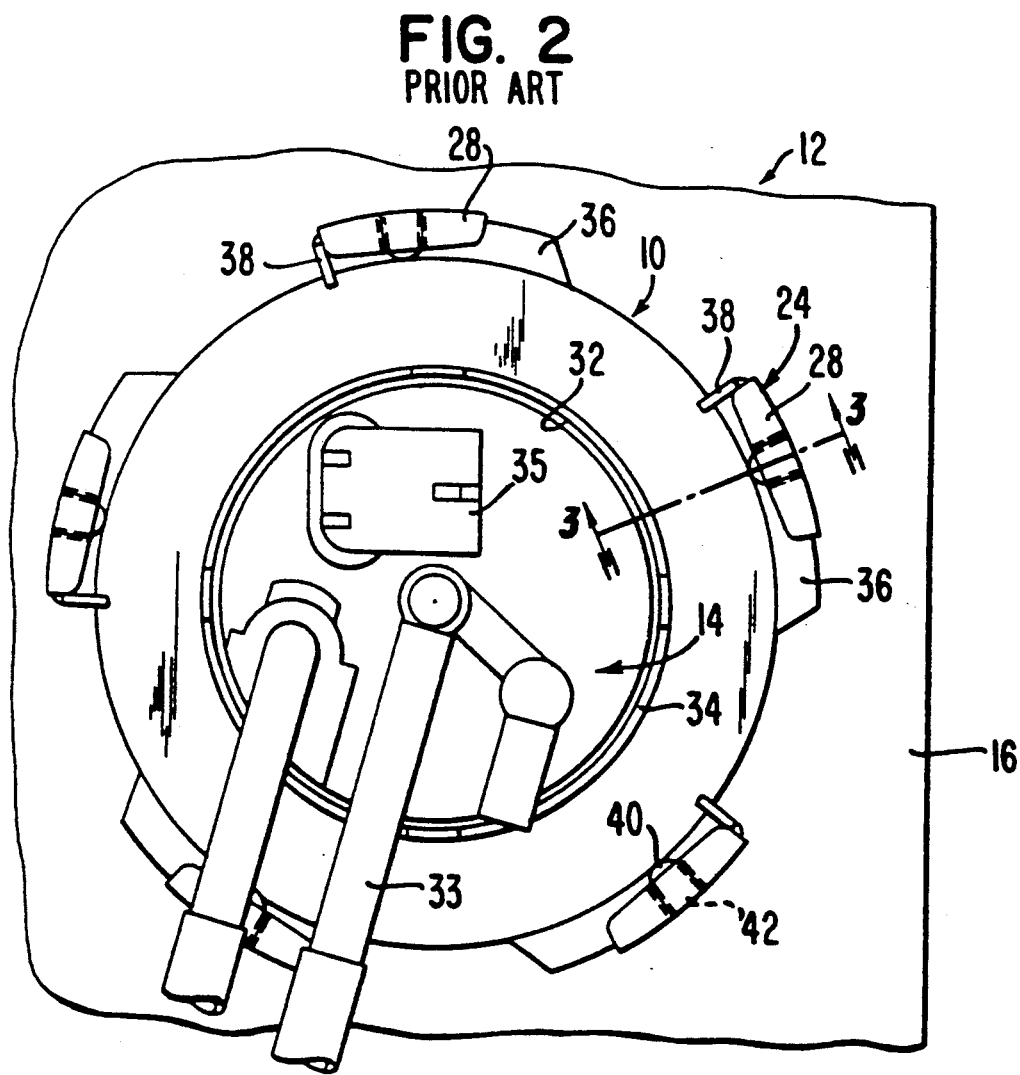
FIG. 2 is a partial top view of a conventional fuel tank assembly illustrating the operational relationship of the several components.
Figure 3:
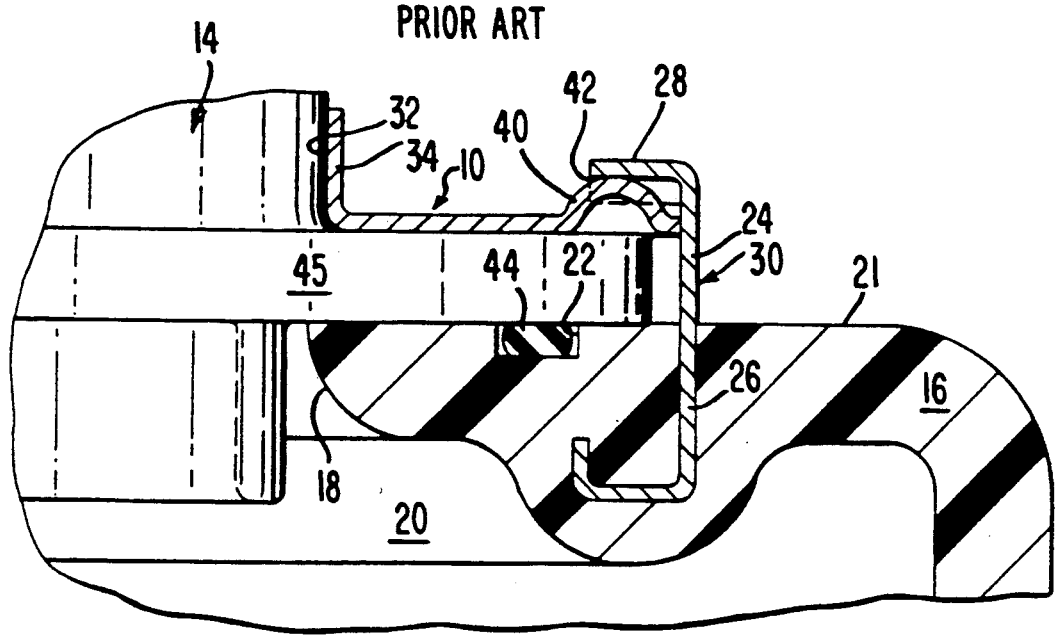
FIG. 3 is a cross-sectional view taken along line A—A of FIG. 2.

Referring now to the drawings, FIGS. 1 through 3 illustrate a conventional fuel sender locking ring 10 for use with a fuel tank assembly 12. Locking ring 10 is employed to secure a fuel sender assembly 14 to fuel tank assembly 12. More particularly, fuel tank assembly 12 comprises a fuel tank 16 having a generally circular opening or aperture 18 through which a lower portion of fuel sender assembly 14 extends. In this manner, various components (not shown) of fuel sender assembly 14 are oriented to partially extend into an internal pressurized chamber 20 of fuel tank 16. Fuel tank 16 has a substantially planar external surface 21 which is generally perpendicular to the axis of aperture 18. An annular groove 22 is provided in external surface 21 which is concentric with the central axis of aperture 18 and which is located radially outward thereof.

Fuel tank assembly 12 further includes means for semi-permanently securing locking ring 10 to fuel tank 16. This includes a plurality of evenly spaced retaining lugs 24 located radially outward of, and concentric with groove 22. Preferably, the arcuate-shaped retaining lugs 24 are disposed around the circumference of groove 22 and have a first leg 26 extending transversely to the planar external surface 21 of fuel tank 16. A second leg 28 is provided which extends radially inwardly from first leg 26 and is generally parallel to planar external surface 21, so as to generally define an inverted "L-shaped" configuration for retaining lugs 24. Preferably, retaining lugs 24 are integral extensions of a ring 30 permanently encapsulated into fuel tank 16. Further, it is preferable that fuel tank 16 be fabricated from a thermoplastic material into which encapsulated ring 30 is permanently secured during the molding process. Such processing could include blow-molding or rotational-molding for the tank fabrication. Again, however, it is within the scope of this invention that the tank 16 be fabricated from any suitable material applicable for pressurized vessels. Likewise, it is contemplated that ring 30 can be secured directly to planar surface 21 via conventional bonding or welding methods.

Locking ring 10 is provided with a central aperture 32 through which an upper portion of fuel sender assembly 14 passes. This allows connection of external fuel delivery and exhaust lines 33 and electrical connectors 35. An axially extending rim 34 provided on locking ring 10 surrounds the upper portion of sender assembly 14. At its outermost peripheral edge surface, locking ring 10 is provided with a plurality of radially outwardly extending lug supports 36. The number and angular spacing of lug supports 36 preferably corresponds directly to the number and angular spacing of retaining lugs 24. As illustrated in FIGS. 2 and 3, each lug support 36 is configured to be received into an "L-shaped" retaining lug 24 upon rotation of locking ring 10 into a locked position. Lug supports 36 have an upstanding tab stop 38 at one end. Tab stops 38 have a greater height than first leg 26 of retaining lug 24 so as to positively locate each lug support 36 relative to a retaining lug 24 during clockwise rotation of locking ring 10 into a locked position. Further, lug supports 36 are provided with a centralized upwardly extending locking nub 40 configured to be lockingly received in a similarly shaped cavity 42 provided in second leg 28 of retaining lugs 24.

In practice, the engagement of locking nubs 40 in cavities 42 combined with the abutting contact of tab stops 38 with a circumferential edge of second leg 28 act to sealingly lock sender assembly 14 to fuel tank 16. Further, a seal member 44 placed in groove 22 is compressed by the locking relationship of the above described components to generate a fluid-tight seal therebetween so as to prevent unintended leakage of fuel liquids and fumes.

However, during vehicular accidents in which the fuel tank is dented or otherwise deformed, or in rollover situations, excessive pressure within fuel tank 16 is generated which urges sender plate 45 of fuel sender assembly 12 and locking ring 10 to deform in a concave fashion. Such deformation plastically deforms retaining lugs 24 in a radially outward direction such that seal member 44 becomes improperly seated within groove 22. As such, premature and excessive leakage of fuel from the tank occurs. As is well recognized, leakage of fuel is extremely dangerous since it creates a significant fire and explosive hazard. Conventional systems, similar to that herebefore described, experience seal loss at relatively low tank pressures which are unacceptable in light of current government automotive crashworthiness standards.

Figure 4:
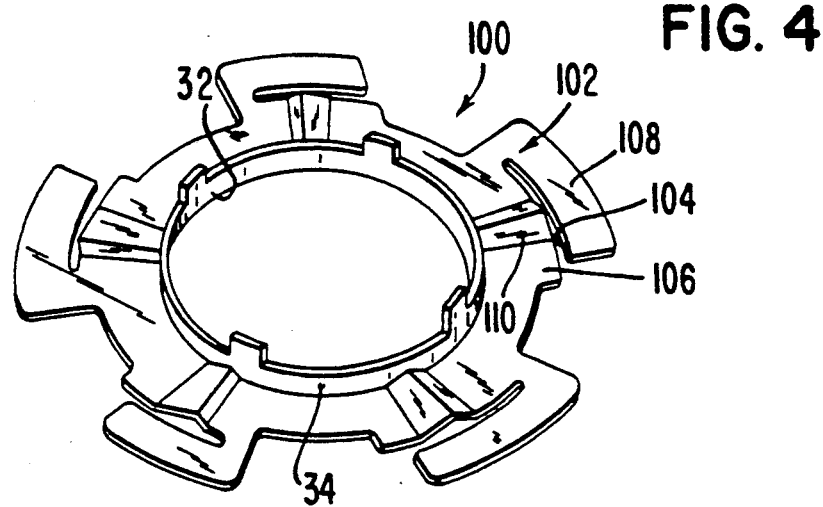
FIG. 4 is a perspective view of an improved fuel sender locking ring according to a first preferred embodiment of the present invention.
Figure 5:
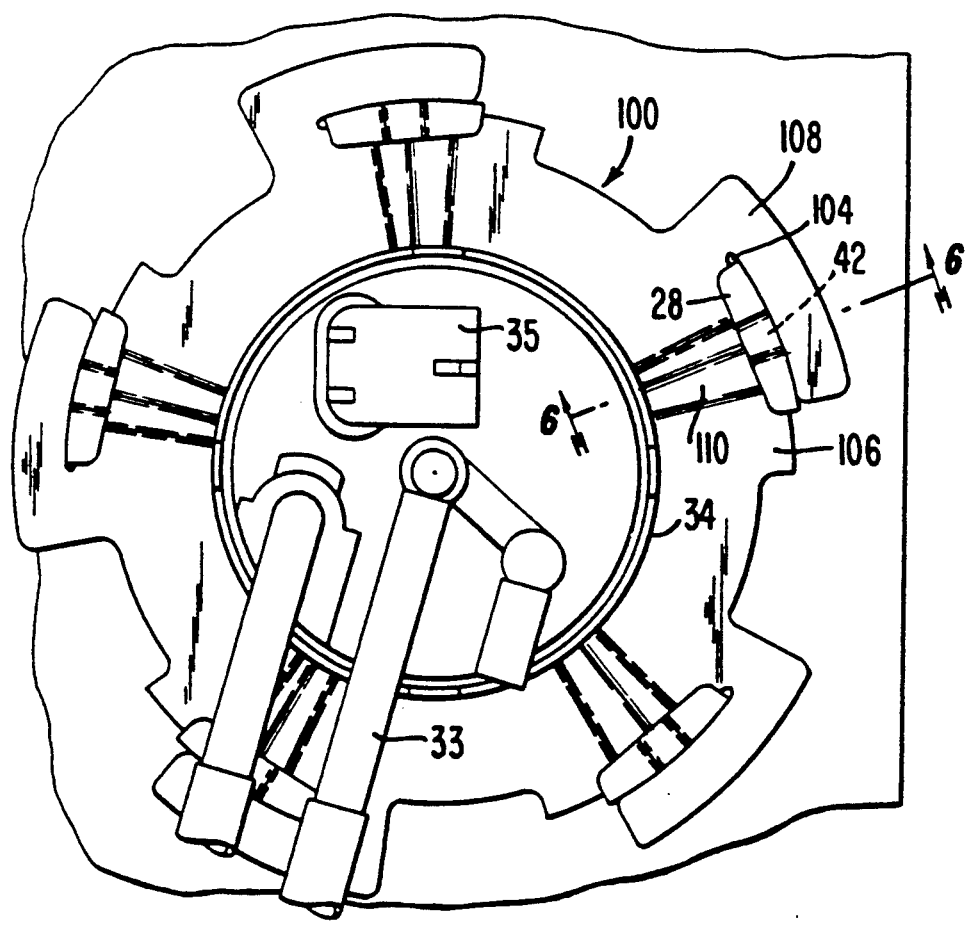
FIG. 5 is a partial top view of a fuel tank assembly incorporating the fuel sender locking ring of FIG. 4 and illustrating the operational association of the components.
Figure 6:
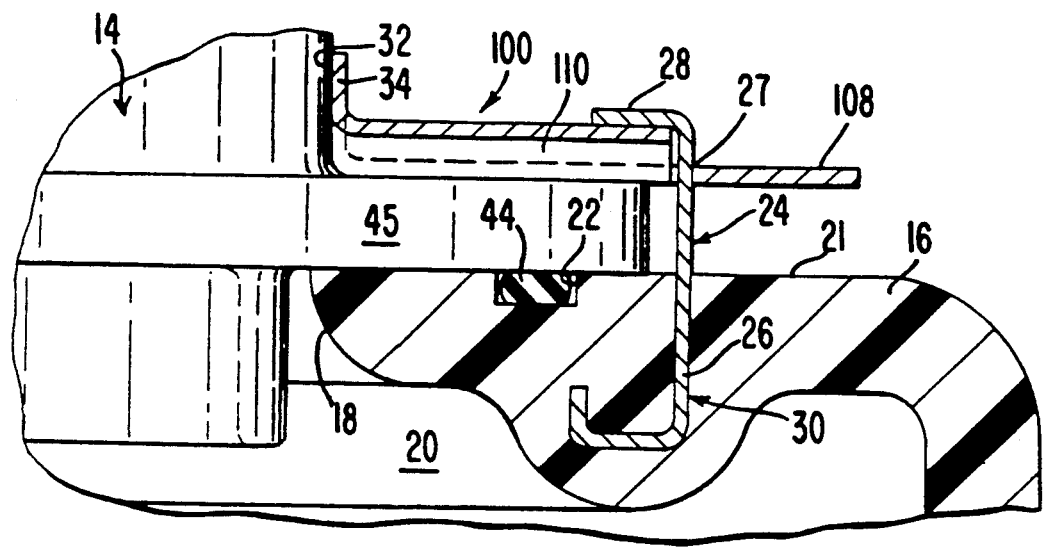
FIG. 6 is a cross-sectional view taken along line B—B of FIG. 5.

Referring now to FIGS. 4 through 6, a first preferred embodiment of the present invention is disclosed. For the sake of uniformity, like numbers are used for common components previously described. FIG. 4 illustrates a fuel sender locking ring 100 having a central aperture 32 and rim 34. Preferably, locking ring 100 is fabricated as a relatively thin gauge sheet metal stamping. At its outermost peripheral edge, locking ring 100 is provided with a plurality of radially outwardly extending lug supports 102. Lug supports 102 include a slot-like arcuate opening 104 extending from one end thereof. The opening 104 defines an inner flange section 106 and an outer flange section 108. Inner flange section 106 includes a centralized portion upon which an upwardly cold-deformed protrusion is provided to define an integral locking surface 110. Locking surface 110 is configured to be lockingly captured in cavity 42 of second leg 28 provided on "L-shaped" retaining lug 24. Outer flange section 108 surrounds an outer surface 27 of first leg 26 of retaining lug 24. Preferably, the width of slot-like opening 104 is dimensioned such that outer surface 27 of first leg 26 and outer flange section 108 are in abutting line contacting along generally the entire length of slot-like opening 104. In this manner, outer flange section 108 inhibits the radially outward "bulging" of retaining lugs 24 upon increased pressure within fuel tank 16. However, it is contemplated that slot-like opening 104 can have a width which does not produce contact between outer surface 27 and outer flange section 108 until a limited predetermined amount of bulging has occurred. In either case, seal element 44 will be maintained in a properly seated position within groove 22. Substantially greater internal fluid pressures are therefore possible following vehicular impact without the danger of excessive leakage of fuel and fumes.

Figure 8:
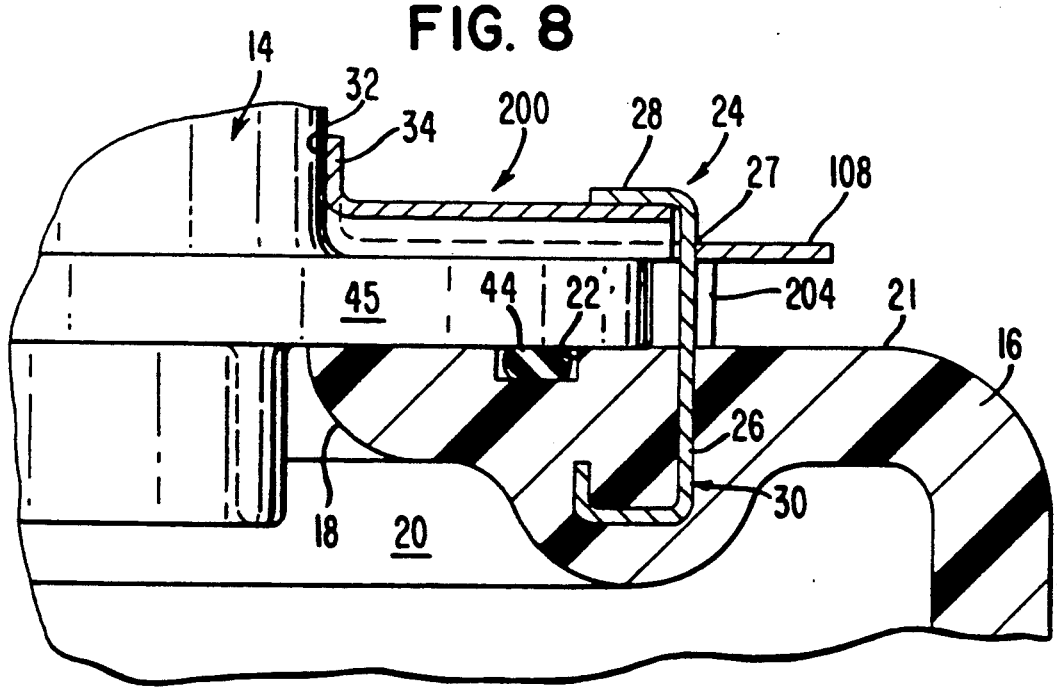
FIG. 8 is a cross-sectional view taken along line C—C of FIG. 7.
Figure 7:
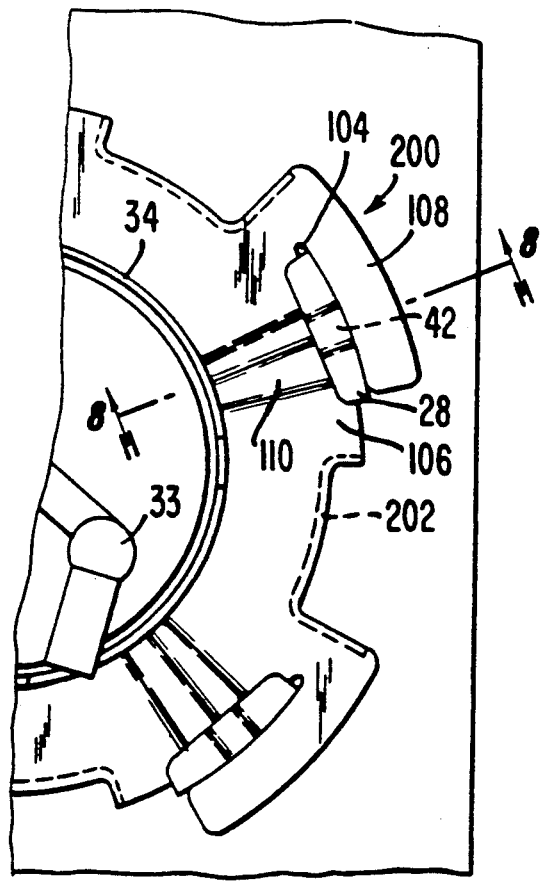
FIG. 7 is a partial top view of a fuel tank assembly incorporating a fuel sender locking ring according to a second preferred embodiment.

Referring now to FIGS. 7 and 8, a second preferred embodiment of the present invention is disclosed. Locking ring 200 is identical to that of locking ring 100 previously described except for the addition of down-turned support members 202 provided as a flange along the peripheral edge of locking ring 200. Support members 202 have an end portion 204 which, preferably, rests on external surface 21 of fuel tank 16. Support members 202 supplement outer flange 108 in resisting deformation ("bulging") of retaining lugs 24. Therefore, sender plate 45 and locking ring 200 are not permitted to prematurely distort and/or yield due to pressures acting thereon so as to prevent the release of fuel tank fumes and liquids.

It is contemplated that the improved locking ring structures disclosed above can be used in any application requiring means for creating a pressurized fluid-tight seal between a cap-like member and a pressurizable vessel which is capable of withstanding substantially greater fluid pressure build-ups.

An improved locking ring for lockingly securing and sealing a fuel sender assembly to a fuel tank is described above. Those skilled in the art will appreciate that other advantages can be obtained from the use of this invention and that modifications can be made without departing from the true spirit of the invention. Furthermore, the foregoing description of the preferred embodiments according to the present invention are provided for the purpose of illustration only and not for purposes of limitation—the invention being defined by the claims.

We claim:

1. A locking member for use in a fuel tank assembly comprising a pressurizable tank with an aperture extending through an external tank surface and a plurality of retaining lugs transversely extending from said external surface along the periphery of said tank aperture, a fuel sender assembly comprising a first portion disposed within said tank and a second portion external to said tank having a plate-like shoulder with a lower surface in a mating contact with said external tank surface, said locking member comprising:

a locking ring having an aperture through which a portion of said fuel sender assembly extends, said locking ring having a generally planar lower surface adapted for a mating contact with an upper surface of said second portion of said fuel sender assembly and having a plurality of lug supports corresponding to said plurality of retaining lugs, said lug supports comprising locking means adapted for lockingly engaging said retaining lugs and lug support means adapted for surrounding said retaining lugs for inhibiting permanent deformation of said retaining lugs due to increased pressure within said tank.

2. A locking member according to claim 1 wherein said retaining lugs are equally spaced around the periphery of said aperture and further comprise lug engaging means for lockingly capturing said locking means upon rotation of said locking ring to a locked position relative to said retaining lugs, said lug engaging means being provided on a radially inwardly extending end portion of said retaining lugs, said end portion being generally parallel to said external tank surface.

3. A locking member according to claim 2 wherein said lug support means comprises a slot-like opening in said lug supports through which said retaining lugs are disposed upon rotation of said locking ring to a locked position, said slot-like opening defining an inner flange section upon which said locking means are provided and an outer flange section surrounding said retaining lugs for inhibiting outward deformation of said retaining lugs upon increased pressure within said tank.

4. A locking member according to claim 3 wherein said lug supports comprise a cold-deformed surface on said inner flange section, wherein said lug engaging means comprises a receptacle, shaped similarly as said cold-deformed surface, said receptacle placed in said end portion of said retaining lugs for lockingly capturing said cold-deformed surface therein upon rotation of said locking ring to a locked position, and wherein said lug support means further comprises an edge surface of said outer flange section abutting an outermost transverse surface of said retaining lugs so as to inhibit permanent deformation thereof.

5. A locking member according to claim 4 wherein said locking ring further comprises a flanged support member associated with each of said lug supports, said flanged support member being located at a radially outward edge of said locking ring and extending generally parallel to said retaining lugs and into engagement with said external tank surface to inhibit permanent deformation of said retaining lugs.

6. A locking ring for locking a fuel sender assembly to a fuel tank comprising:

an aperture through which a portion of said fuel sender assembly extends from said fuel tank;

a surface adapted for a mating contact with said portion of said fuel sender assembly; and a plurality of lug supports comprising:
  a locking means adapted for lockingly engaging retaining lugs of said fuel tank; and
  a lug support means adapted to surround said retaining lugs, said lug support means adapted for surrounding said retaining lugs for inhibiting permanent deformation of said retaining lugs due to increased pressure within said fuel tank.

7. A locking ring according to claim 6 wherein said locking ring further comprises at least one flanged support member associated with said lug supports, said flanged support member being located at a radially outward edge of said locking ring and extending generally parallel to said retaining lugs and into engagement with external surface of said tank to inhibit permanent deformation of said retaining lugs.

* * * * *